United States Patent
Butler et al.

(10) Patent No.: US 12,425,310 B2
(45) Date of Patent: Sep. 23, 2025

(54) MANAGEMENT OF RESOURCES FOR CONTENT ASSETS

(71) Applicant: Comcast Cable Communications, LLC, Philadelphia, PA (US)

(72) Inventors: Marc Butler, Denver, CO (US); Richard Fliam, Greenwood Village, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 109 days.

(21) Appl. No.: 14/815,438

(22) Filed: Jul. 31, 2015

(65) Prior Publication Data

US 2017/0034011 A1    Feb. 2, 2017

(51) Int. Cl.
H04L 41/00    (2022.01)

(52) U.S. Cl.
CPC .................. H04L 41/30 (2013.01)

(58) Field of Classification Search
CPC ........ H04L 12/24; H04L 12/923; H04L 41/30
USPC ........................................................ 709/226
See application file for complete search history.

(56) References Cited

U.S. PATENT DOCUMENTS

| | | | |
|---|---|---|---|
| 5,790,642 | A | 8/1998 | Taylor et al. |
| 6,920,632 | B2 | 7/2005 | Donovan et al. |
| 2004/0010592 | A1* | 1/2004 | Carver ................. H04L 47/805 |
| | | | 709/226 |
| 2007/0087756 | A1* | 4/2007 | Hoffberg .............. G06Q 20/065 |
| | | | 455/450 |
| 2010/0057514 | A1 | 3/2010 | Chee et al. |
| 2010/0223148 | A1* | 9/2010 | Payton ............... G06Q 30/0601 |
| | | | 705/26.1 |
| 2011/0212717 | A1* | 9/2011 | Rhoads ................... G06F 16/58 |
| | | | 455/420 |
| 2012/0053992 | A1* | 3/2012 | Erol .................... G06Q 30/0206 |
| | | | 705/7.35 |
| 2012/0284410 | A1* | 11/2012 | Dudek .................. G06F 9/5027 |
| | | | 709/226 |
| 2012/0289147 | A1* | 11/2012 | Raleigh .............. H04N 21/6547 |
| | | | 455/3.06 |
| 2013/0159040 | A1* | 6/2013 | Sarmenta .............. G06F 15/173 |
| | | | 705/7.15 |
| 2014/0074641 | A1* | 3/2014 | Wang ..................... H04L 41/30 |
| | | | 718/103 |
| 2014/0278981 | A1* | 9/2014 | Mersov .................. G06Q 30/02 |
| | | | 705/14.53 |
| 2014/0279133 | A1* | 9/2014 | Lee ........................ G06Q 30/08 |
| | | | 705/26.3 |
| 2015/0046279 | A1* | 2/2015 | Wang .................... G06F 9/5027 |
| | | | 705/26.3 |
| 2016/0087912 | A1* | 3/2016 | Haley ................... H04L 65/611 |
| | | | 705/26.3 |
| 2017/0357530 | A1* | 12/2017 | Shih ...................... G06F 9/4887 |

* cited by examiner

*Primary Examiner* — Emmanuel L Moise
*Assistant Examiner* — Zia Khurshid
(74) *Attorney, Agent, or Firm* — Ballard Spahr LLP

(57) ABSTRACT

Provided are methods and systems whereby a request for a task relating to a content asset can be received. Information related to the task can be transmitted. A plurality of bids can be received in response to the transmitted information. Each bid can originate from a corresponding device such as a video packager. Each bid can represent a network related cost associated with the corresponding video packager accepting the task. A winning bid can be determined from the plurality of bids.

20 Claims, 5 Drawing Sheets

MANAGEMENT OF RESOURCES FOR CONTENT ASSETS

BACKGROUND

One component of managing content asset resources for performing tasks includes managing client requests for the resources. Task assignment is inefficient if a tasker does not have sufficient knowledge about the current workload of the content asset resources. For example, a tasker might assign a task involving processing and/or packaging video content to a processor and/or packager that is currently overloaded, when another processor and/or packager is available. These and other shortcomings of the prior art are addressed by the present disclosure.

SUMMARY

It is to be understood that both the following general description and the following detailed description are exemplary and explanatory only and are not restrictive, as claimed. Provided are methods and systems for efficiently tasking resources related to content assets. In an aspect, in response to receiving a request for a task, a computing device such as a task resource manager, which may be referred to as a tasker, can request to receive bids from various resources for performing the task. In an aspect, a bid can comprise information about a resource's capabilities, computing resources, content availability, etc. In an aspect, a bid can comprise a number or some other field whose value indicates a resource's ability to perform a task based on the resource's capabilities, computing resources, content availability, etc. In response to receiving a request for a bid, resources, such as content asset resources, video packagers and/or video processors, can bid on the task. In an aspect, the tasker can analyze the received bid. The tasker can select a resource with the winning bid based on analyzing the received bids. The tasker can transmit the data needed to perform the task to the resource associated with the winning bid. The content asset resource can perform the task and transmit the resulting data to the requester of the task.

In some aspects, the methods and systems described herein relate generally to management of network resources, such as taskers, packagers, and processors, to deliver video more efficiently. A tasker can be any device/software used for receiving a task and assigning the task to a resource for fulfillment of the task. A packager can be any device/software used for packaging content for delivery. A processor can be any device/software used for processing content. In an aspect, a tasker can receive a request comprising a task related to content from a client and determine which of a plurality of processors/packagers is/are appropriate for the handling the task and transmit the task to the appropriate processor and/or packager. In an aspect, the methods disclosed can allow a tasker to receive client-requested content but, instead of unilaterally deciding which packager to task with delivery, the tasker advertises that a task (e.g., delivery of content) needs to be performed. In response to the advertisements, packagers can bid on the task and the tasker can select a packager to perform the task based on the bids. In this environment, network resources can broadcast respective capabilities and availabilities to other network resources.

In other aspects, methods and systems are described whereby a request for a task relating to a content asset can be received. In an aspect, the request can originate from a client device and can be transmitted to a tasker. Information related to the task can be transmitted from the tasker to a plurality of other taskers, as well as to a plurality of video packagers. A plurality of bids can be received in response to the transmitted information with each bid originating from a corresponding video packager. Each bid can represent a cost associated with the corresponding video packager accepting the task, and a winning bid can be determined from the plurality of bids. The tasker can select a video packager with the winning bid to complete the task and the content asset can be transmitted to the video packager. The selected video packager can complete the task and return a packaged content asset (e.g., video) associated with the request to the client device. Methods and systems are also described for determining an appropriate bid to transmit in response. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
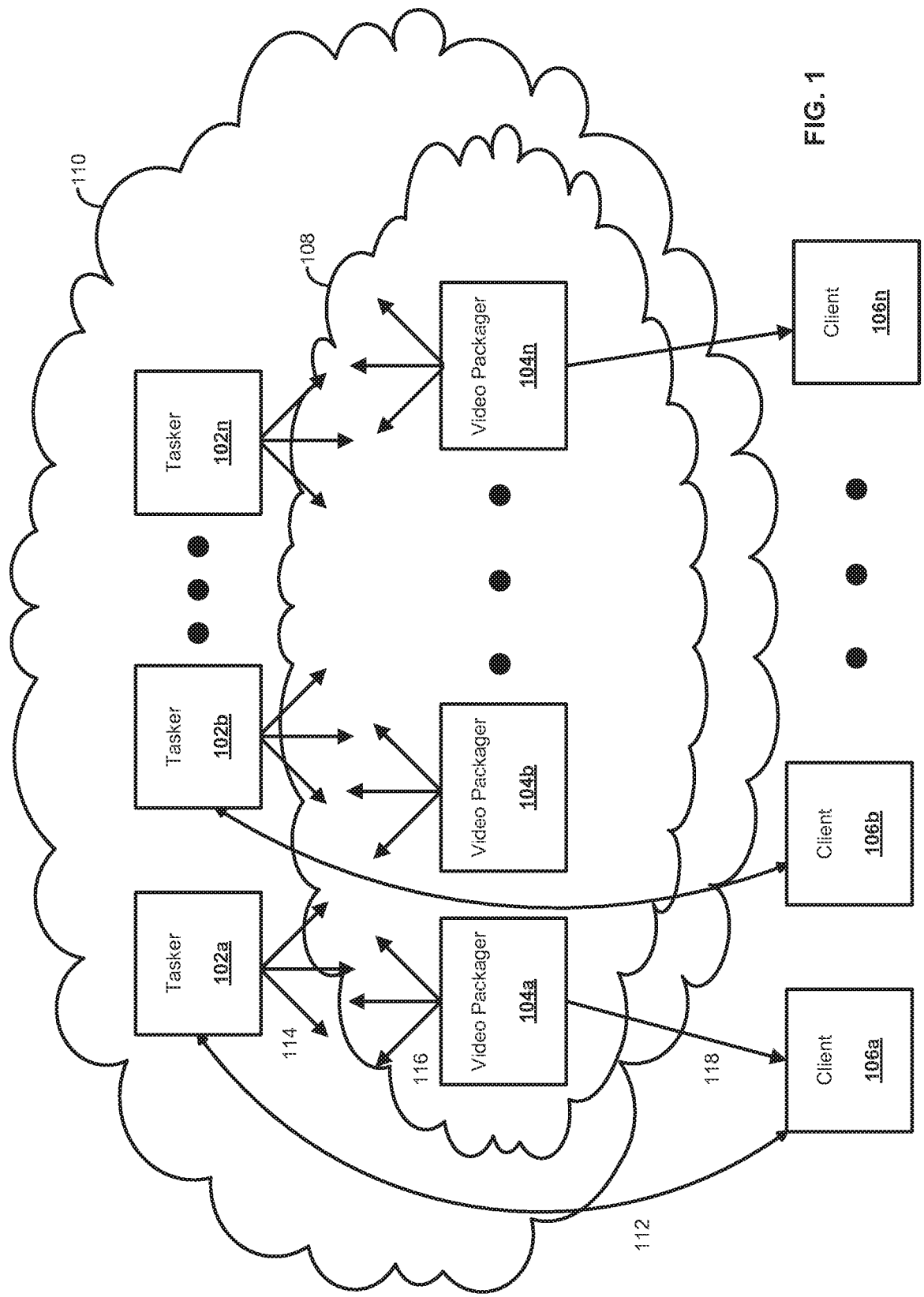
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks. CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The methods and systems described herein allow for autonomy and dynamism in a network for packaging and/or processing content by using a bidding system in response to requests for tasks from client devices. A client device can transmit a request comprising a task to a tasker. If the task calls for a video packager, then the tasker can advertise the task to a plurality of video packagers. In an aspect, a packager can be any device/software used for packaging content for delivery, such as ARRIS's Spectrum CPC. If the task calls for a video processor, then the tasker can advertise the task to a plurality of video processors. In an aspect, a processor can be any device/software used for processing content, such as ARRIS's MSP2800. The plurality of video packagers and/or processors each can transmit a bid on the task to the tasker, wherein each bid is based on the corresponding video packager's/processor's ability to handle the task, based on factors such as the current workload for the video packager/processor. From the bids, the tasker can select a video packager/processor with a winning bid and transmit the task to the selected video packager/processor. The video packager/processor can complete the task and transmit the resulting video to the client device.

The methods and systems described herein allow for better management of resources in networks by enabling taskers to coordinate among themselves. In an aspect, a tasker can receive a request from a client. The tasker can then request for bids from packagers and/or processors associated with handling the task. In an aspect, packagers/processors can bid on the task advertised by taskers. In an aspect, packagers/processors can employ custom heuristics to determine current task loading across all the packagers/processors. For example, if a first packager/processor detects that other packagers/processors are giving more competitive bids, the first packager/processor can determine that the workload of other packagers/processors in the network is light compared its own workload. In an aspect, the methods and systems described herein are capable of handling a failure with one or more of the packagers, processors, and/or taskers. For example, if a packager/processor becomes disabled, then the disabled packager/processor will no longer respond to requests for bids from taskers, and will therefore no longer receive tasks. In an aspect, the methods and systems described herein allow for automatic integration of new taskers and packagers/processors. For example, because a packager/processor is not tied to one tasker, when a tasker requests a bid for a new task, any packager/processor, including newly introduced packagers/processors, can bid on the new task. The systems and methods described herein thus allow for an autonomous network and autonomous packaging/processing balancing. The taskers and packagers/processors can use virtual local area network (VLAN) hierarchies to coordinate autonomously. The taskers can communicate with each other and can function despite having incomplete information.

FIG. 1 illustrates an exemplary system. In an aspect, a plurality of video packagers 104*a-n* can form a virtual local area network (VLAN) 108. In another aspect, a plurality of processors can form VLAN 108. In another aspect, a plurality of video packagers 104*a-n* and processors can form VLAN 108. Even though VLAN 108 can comprise video packagers 104*a-n*, processors, and other resources for handling video requests, the remainder of FIG. 1 will be described with regard to video packagers 104*a-n*. The plurality of video packagers 104*a-n* can be in communication with each other, with a plurality of taskers 102*a-n*, and a plurality of clients 106*a-n*. The plurality of video packagers 104*a-n* and the plurality of taskers 102*a-n* can form a second VLAN 110. In an aspect, a tasker 102*a-n* can be any device/software capable of receiving a request for a task relating to video packaging and determining a video packager 104*a-n* to accomplish the task. A client 106*a-n* can be any device/software capable of requesting a task related to video packaging and receiving the requested packaged video. An exemplary transmission of a request for a task related to a content asset can be illustrated in communication 112, wherein client 106*a* can transmit the request to tasker 102*a*. A task can comprise a request to package video and/or process video. A task can comprise one or more parameters, such as a deadline, an expected completion time, and/or a number of profiles, such as encoding format, bit rate, resolution, and the like.

In response to receiving the request, tasker 102*a* can advertise the request to the plurality of video packagers 104*a-n*, such as via communications 114. In an aspect, tasker 102*a* can advertise the request to other taskers 102*b-n*. Transmitting the information to the plurality of video packagers 104*a-n* can prompt the plurality of video packagers 104*a-n* to respond to the tasker 102*a* with a plurality of bids. Transmitting the information to the other taskers 102*b-n* allows the other taskers 102*b-n* to track the task being requested by tasker 102*a*.

Communications 116 between video packagers 104*a-n* and the tasker 102*a* can comprise bids for the task. Prior to transmitting a bid in a communication 116, the bid can be determined. In determining a bid, a video packager, such as video packager 104*a*, can consider a number of factors. Such factors can include properties of the task, properties of the content asset related to the task, properties of the video packager 104*a*, information related to tasks currently being served by the video packager 104*a*, information related to tasks currently being served by the other video packagers 104*b-n*, any other factors for determining the appropriateness for the video packager 104*a* to take on the task, and/or any combination of the foregoing. Properties of the task can include a deadline, an expected completion time, and/or a number of profiles. For example, a bid can be based on the video packager's ability to meet a deadline, wherein a higher (or lower) bid indicates a more likely ability to meet the deadline. Properties of the content asset related to the task can include a size, composition, and/or length. Properties of the video packager 104*a* can include a threshold determination that the video packager 104*a* is capable of handling the requested task (e.g., available codecs, etc). Information related to tasks currently being served by the video packager 104*a* can include an expected completion time, a current workload of the video packager 104*a*, and the like. For example, a bid can be based on the video packager's queue, wherein a higher (or lower) bid indicates a more crowded queue. In an aspect, information related to tasks currently being served by the other video packagers 104*b-n* can be based on a plurality of bids for a plurality of previous tasks. Based on the plurality of bids for the plurality of previous tasks, the video packager 104*a* can get a picture of the overall workload of the other video packagers 104*b-n* in VLAN 108 and estimate what a competitive bid would be. For example, the video packager 104*a* can store recent bids for recent tasks from other video packagers, as well as recently calculated bids of video packager 104*a*, in a database and determine if a recently calculated or a currently calculated bid is competitive with the stored bids from other video packagers. In an aspect, information related to tasks currently being served by the other packagers 104*b-n* can be based on a plurality of bids for the current task. Based on the plurality of bids for the current task, the video packager 104*a* can estimate what a competitive bid would be. For example, the video packager 104*a* can receive current bids for current tasks and determine if the bid it calculates is competitive with the received bids.

In an aspect, video packagers 104*a*, 104*c*, and 104*d* can respond to the tasker 102*a* with bids for the task. The responsive video packagers 104*a,c,d* can each calculate a corresponding bid based on one or more of the factors described above. In an aspect, a bid can be based on one or more queues of a video packager 104*a,c,d*. In an aspect, a bid can be based on an expected computational expenditure associated with the tasks already in its queue or expected to be in its queue. In an aspect, a bid can be based on a completion time associated with the tasks in its queues. In an aspect, a bid can be based on properties of a prospective task, such as a priority, a deadline, and/or a cost. For example, a priority can determine the position the prospective task will be placed in a queue. In such an example, the bid can be based on the expected completion time of the tasks that would be in front of the prospective task in the queue, as well as that of the prospective task. In an aspect, a prospective task can comprise a deadline and the bid can be based on a likelihood that the packager will be able to meet the deadline in light of tasks currently in its queue. In an aspect, the bid can be based on a cost. In an aspect, the cost can be based on a computational time and/or expenditure of the packager to complete the task. For example, a packager may be capable of, but inefficient at, performing a certain type of task. In such an instance, the packager would give a less desirable bid for the type of task than a packager that can perform the task more efficiently (or at a lower cost). In an aspect, the cost can be based on the cost to the tasks currently in the packager's queue. For example, if the prospective task has a high priority, allowing it the first position in the packager's queue, the cost can be the additional time each task in the queue will be delayed by accepting the task. If accepting the task will greatly increase the likelihood that a task in the queue will miss its deadline, then the cost can increase. In an aspect, a bid can be based on default events. A default event can be when a video packager receives a task, but fails to complete the task. A default event can be a task dropped from a queue. A default event can be indicated by a client retransmit the same request. Video packagers 104*b* and 104*n* can also refrain from responding to the tasker 102*a* with a bid for the task. In an aspect, a nonresponsive video packager, such as video packager 104*b*, for example, can make a threshold decision that the video packager 104*b* is not capable of performing the task related to the information transmitted from tasker 102*a*. For example, if the request involves packaging high definition video, and video packager 104*b* is not capable of packaging high definition video, then video packager 104*b* may not reply. In another example, the request can comprise a deadline, and the video packager 104*b* cannot meet the deadline because of the tasks already in its queue, then the video packager 104*b* may not reply. In an aspect, a nonresponsive video packager, such as video packager 104*n*, for example, can determine that the bid the video packager 104*n* calculates or would calculate would not be competitive with the bids transmitted by the other video packagers. In an aspect, the video packager 104*n* can make the determination that the bid the video packager 104*n* calculates or would calculate is not competitive with bids transmitted by other video packagers based on a plurality of bids transmitted in response to a plurality of previous tasks and/or the current task. In an aspect, the video packager 104*n* can make the determination that the bid the video packager 104*n* would calculate is not competitive before or after the video packager 104*n* calculates the bid.

In response to receiving the bids from the responsive video packagers 104*a,c,d*, the tasker 102*a* can determine a winning bid. The winning bid can be a lowest of the received bids. For example, bids can correlate with an expected completion time. In such an example, a lower bid can indicate a lower completion time. The winning bid can be a highest of the received bids. For example, bids can correlate with a likelihood that the corresponding video packager will be able to complete the task. In such an example, the task can comprise a deadline, and a higher bid can indicate a higher percentage likelihood that the corresponding video packager will be able to meet the deadline.

In an aspect, a tasker can transmit a content asset to a video packager associated with a winning bid. As an example, the tasker 102*a* can determine that the bid associated with a video packager 104*a* is the winning bid. In response to determining the winning bid, the tasker 102*a* can transmit the content asset to the video packager 104*a*. The video packager 104*a* can process and/or package the content asset in accordance with the task.

In an aspect, a video packager can transmit a processed and/or packaged content asset from the video packager to a client. In an aspect, the video packager 104*a* can transmit the processed content asset to the client 106*a* that originated the request. In an aspect, if the client 106*a* fails to receive the processed content asset, the client 106*a* can resend the request to tasker 102*a* via communication 112 or send the request to one of the plurality of other taskers 102*b-n*, starting the process over.

The systems and methods described herein comprising self-management among the clients 106*a-n*, direct communication between clients 106*a-n* and taskers 102*a-n*, and dynamic bidding for tasks by video packagers 104*a-n*, can function without the need for centralized tracking of tasks. As described above, if one of the plurality of clients does not receive the requested processed content asset, the client can retransmit the request to a tasker. The systems and methods described herein also mitigate the risk that a failure of one of the plurality of video packagers 104*a-n* will cause a system disruption. Once a video packager fails, the plurality of taskers 102*a-n* can stop sending tasks to the failed video packager because the failed video packager will stop bidding on tasks. The systems and methods described herein also mitigate the risk that a failure of one of the plurality of taskers 102*a-n* will cause a system disruption. Because a client, such as client 106*a* can communicate directly with a tasker, such as tasker 102*a*, in the event that the tasker 102*a* becomes unresponsive, the client 106*a* can transmit a request for a task to another tasker, such as tasker 102*b*.

Figure 2:
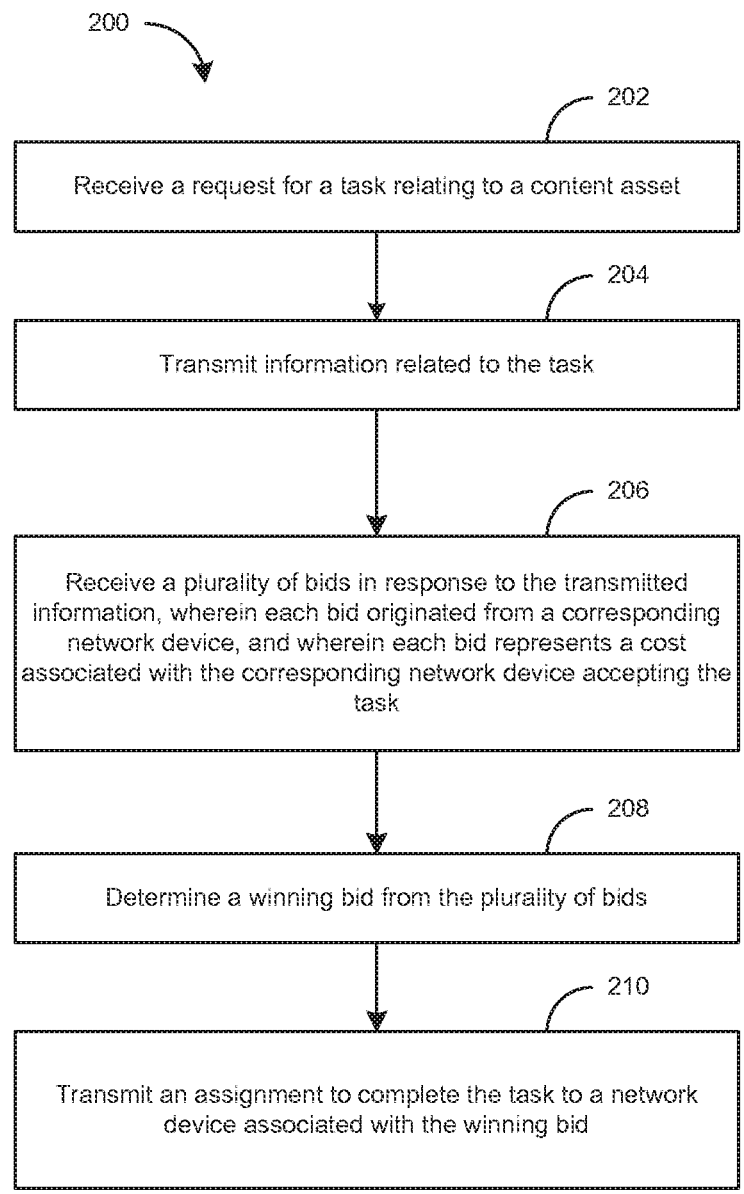
FIG. 2 is a flow chart of an exemplary method.

FIG. 2 is a flowchart illustrating an example method 200. In an aspect, a request can be received for a task relating to a content asset (e.g., video, audio, targeted advertisement, etc) at 202. The task can comprise a request to package video and/or process video. A task can comprise a deadline, an expected completion time, and/or a number of profiles. The content asset related to the task can comprise properties, such as, a size, duration composition, properties based on the requesting device such bit rate, resolution, etc. In an aspect, the request can be transmitted from a client device. In an aspect, the request can be received at a tasker.

In an aspect, information related to the task can be transmitted at 204. For example, the transmitted information can be transmitted by the tasker. The tasker may transmit the information in a variety of ways, e.g., broadcast, multicast, etc., to a plurality of network devices associated with or managed and controlled by the tasker. In an aspect, the transmitted information can be received by other taskers. In an aspect, the transmitted information can be received by a plurality of resources and/or one or more network devices, such as video packagers and/or processors. The information can comprise one or more of: a size of the content asset related to the task, a composition of the content asset related to the task, a length of the content asset related to the task, a number of profiles, user device requirements such aspect ratio, bit rate, resolution, and a deadline. The foregoing list of properties is exemplary and not exhaustive.

At 206, a plurality of bids can be received in response to the transmitted information. In an aspect, the tasker that transmitted the information can receive the plurality of bids. Each bid can originate from a corresponding network device such as a video packager/processor. Each bid can represent a cost associated with the corresponding network device accepting the task. For example, the cost can be a value that represents an expected time associated with a corresponding network device completing the task. In an aspect, the cost can be based on a computational time and/or expenditure of the packager to complete the task. For example, a packager may be capable of hut inefficient at, performing a certain types of task. In such an instance, the packager would give a less desirable bid for the type of task than a packager that can perform the task more efficiently (or at a lower cost). In an aspect, the cost can be based on the cost to the tasks currently in the packager's queue. For example, if the prospective task has a high priority, allowing it the first position in the packager's queue, the cost can be the additional time each task in the queue will be delayed by accepting the task. If accepting the task will greatly increase the likelihood that a task in the queue will miss its deadline, then the cost can increase. In an aspect, the cost can be determined based on an analysis of one or more queues of the corresponding network device. For example, a bid can be based on a completion time associated with existing tasks in queues. In an aspect, a bid can be based on one or more queues of a network device, such as a video packager 104*a,c,d*. In an aspect, a bid can be based on an expected computational expenditure associated with the tasks already in its queue or expected to be in its queue. In an aspect, a bid can be based on a completion time associated with the tasks in its queues. In an aspect, a bid can be based on properties of a prospective task, such as a priority or a deadline. For example, a priority can determine the position the prospective task will be placed in a queue. In such an example, the bid can be based on the expected completion time of the tasks that would be in front of the prospective task in the queue, as well as that of the prospective task. In an aspect, a prospective task can comprise a deadline and the bid can be based on a likelihood that the packager will be able to meet the deadline in light of tasks currently in its queue. Network devices, such as video packagers 104*b* and 104*n*, can also refrain from responding to the tasker 102*a* with a bid for the task. In an aspect, a nonresponsive network device, such as video packager 104*b*, for example, can make a threshold decision that the network device is not capable of performing the task related to the information transmitted from tasker 102*a*. For example, if the request involves packaging high definition video, and video packager 104b is not capable of packaging high definition video, then video packager 104b may not reply. In another example, the request can comprise a deadline, and the network device cannot meet the deadline because of the tasks already in its queue, then the network device may not reply. In an aspect, a nonresponsive network device, such as video packager 104n, for example, can determine that the bid the network device calculates or would calculate would not be competitive with the bids transmitted by the other network devices. In an aspect, the network device can make the determination that the bid the network device calculates or would calculate is not competitive with bids transmitted by other network devices based on a plurality of bids transmitted in response to a plurality of previous tasks and/or the current task. In an aspect, the nonresponsive network device can make the determination that the bid the network device would calculate is not competitive before or after the network device calculates the bid. In an aspect, a threshold determination can be made by at least one of network devices associated with the plurality of bids that the network device is capable of handling the task before calculating a bid. In another aspect, at least one of the plurality of bids can be based on one or more of: a current workload of the corresponding network device, a size of the content asset related to the task, a composition of the content asset related to the task, a length of the content asset related to the task, a number of profiles, an expected completion time for the task, a deadline to complete the task, and the like.

In an aspect, a winning bid can be determined from the plurality of bids at 208. In an aspect, the tasker that received the plurality of bids can determine the winning bid. In an aspect, the winning bid can be a lowest based on cost of the plurality of bids. For example, bids can correlate with an expected completion time. In such an example, a lower bid can indicate a lower completion time. In an aspect, the winning bid can be a highest of the plurality of bids. For example, bids can correlate with a likelihood that the corresponding network device will be able to complete the task. In such an example, the task can comprise a deadline, and a higher bid can indicate a higher percentage likelihood that the corresponding network device will be able to meet the deadline.

At step 210, an assignment to complete the task can be transmitted to a network device associated with the winning bid. In an aspect, the network device can be a video packager/processor. The network device can complete the task and transmit the processed and/or packaged content asset (e.g., video) to the client.

Optionally, the content asset can be transmitted to a network device associated with the winning bid. In an aspect, a location can be transmitted to a network device associated with the winning bid, wherein the location comprises the content asset. In an aspect, instructions can be transmitted to a network device associated with the winning bid, wherein the instructions comprise directions for obtaining the content asset.

Figure 3:
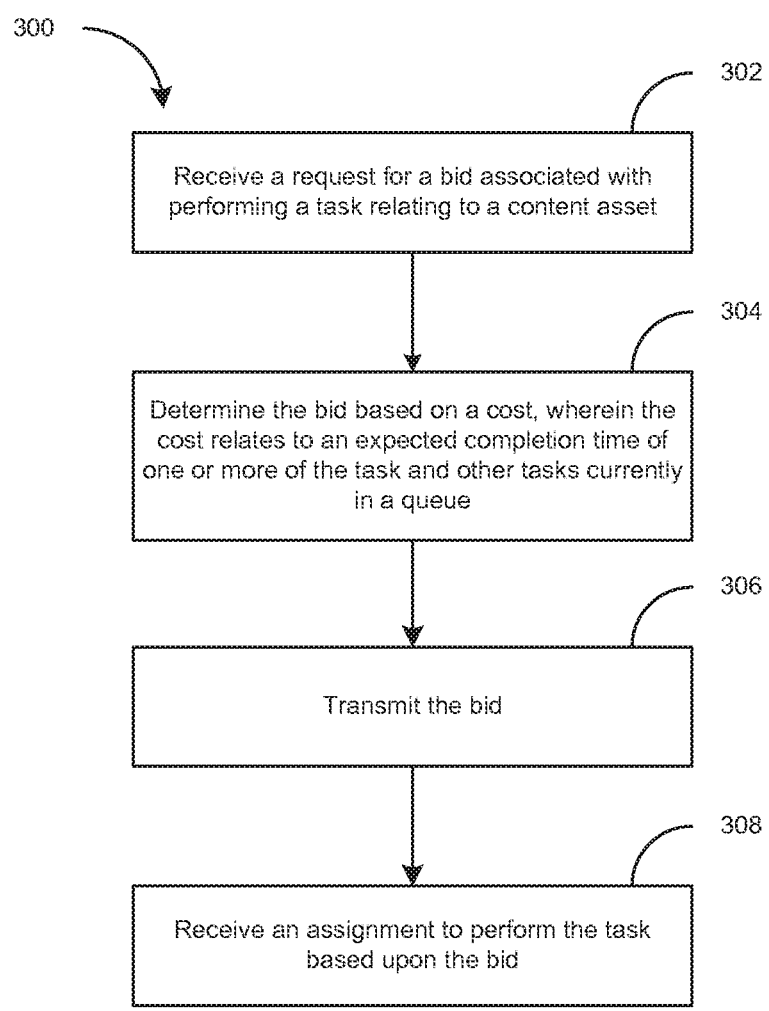
FIG. 3 is a flow chart of an exemplary method.

FIG. 3 is a flowchart illustrating an example method 300. At step 302, a request can be received for a bid associated with performing a task relating to a content asset. The request can be transmitted from a tasker to a network device, such as a video packager/processor. The request can be transmitted through a VLAN, such as VLAN 110 in FIG. 1. The request can be transmitted using any messaging protocol or combination of messaging protocols, such as the Transmission Control Protocol (TCP) and/or the Internet Protocol (IP). The request can comprise one or more of: a size of the content asset related to the task, a composition of the content asset related to the task, a length of the content asset related to the task, a number of profiles, and a deadline. The task can comprise a request to package video and/or process video. A task can comprise a deadline, an expected completion time, and/or a number of profiles. The content asset related to the task can comprise properties, such as, a size, composition, and/or length. In an aspect, the request can originate from a client device.

The bid can be determined based on a cost at 304. The cost the cost can relate to an expected completion time of one or more of the task and other tasks currently in a queue. Determining the bid based on a cost can comprise determining a network device's capability to service the task. For example, if the task requires the packaging of high definition video and a particular video packager/processor is not capable of packaging high definition video, then the particular packager/processor does not need to determine and transmit a bid for the task. However, if the network device determines that it is capable of servicing the task, then it can determine the bid. The bid can be based on one or more of: a current workload of the corresponding network device, a size of the content asset related to the task, a composition of the content asset related to the task, a length of the content asset related to the task, a number of profiles, an expected completion time for the task, a deadline to complete the task, and the like. In an aspect, determining the bid based on a cost can comprise receiving a plurality of bids from a plurality of network devices, and determining if the determined bid is competitive with the plurality of bids. In an aspect, a bid can be based on one or more queues of a network device, such as a video packager 104a,c,d. In an aspect, a bid can be based on an expected computational expenditure associated with the tasks already in its queue or expected to be in its queue. In an aspect, a bid can be based on a completion time associated with the tasks in its queues. In an aspect, a bid can be based on properties of a prospective task, such as a priority or a deadline. For example, a priority can determine the position the prospective task will be placed in a queue. In such an example, the bid can be based on the expected completion time of the tasks that would be in front of the prospective task in the queue, as well as that of the prospective task. In an aspect, a prospective task can comprise a deadline and the bid can be based on a likelihood that the packager will be able to meet the deadline in light of tasks currently in its queue. In an aspect, the cost can be based on a computational time and/or expenditure of the packager to complete the task. For example, a packager may be capable of, but inefficient at, performing a certain types of task. In such an instance, the packager would give a less desirable bid for the type of task than a packager that can perform the task more efficiently (or at a lower cost). In an aspect, the cost can be based on the cost to the tasks currently in the packager's queue. For example, if the prospective task has a high priority, allowing it the first position in the packager's queue, the cost can be the additional time each task in the queue will be delayed by accepting the task. If accepting the task will greatly increase the likelihood that a task in the queue will miss its deadline, then the cost can increase. In an aspect, a bid can be based on default events. A default event can be when a network device, such as a video packager receives a task, but fails to complete the task. A default event can be a task dropped from a queue. A default event can be indicated by a client retransmit the same request. Network devices, such as illustrated video packagers 104b and 104n, can also refrain from responding to the tasker 102a with a bid for the task. In an aspect, a nonresponsive network device, such as video packager 104*b*, for example, can make a threshold decision that the network device is not capable of performing the task related to the information transmitted from tasker 102*a*. For example, if the request involves packaging high definition video, and video packager 104*b* is not capable of packaging high definition video, then video packager 104*b* may not reply. In another example, the request can comprise a deadline, and the nonresponsive network device cannot meet the deadline because of the tasks already in its queue, then the network device may not reply. In an aspect, a nonresponsive video packager, such as video packager 104*n*, for example, can determine that the bid the video packager 104*n* calculates or would calculate would not be competitive with the bids transmitted by the other video packagers. In an aspect, the nonresponsive network device can make the determination that the bid the network device calculates or would calculate is not competitive with bids transmitted by other network devices based on a plurality of bids transmitted in response to a plurality of previous tasks and/or the current task. In an aspect, the nonresponsive network device can make the determination that the bid the network device would calculate is not competitive before or after the network device calculates the bid.

The bid can be transmitted at 306, for example from the network device to the tasker. The bid can be transmitted through a VLAN, such as VLAN 110 in FIG. 1. The bid can be transmitted using any messaging protocol or combination of messaging protocols, such as the Transmission Control Protocol (TCP) and/or the Internet Protocol (IP). In an aspect, the tasker can determine that the bid is a winning bid and transmit the task to the network device.

At 308, an assignment to perform the task can be received based upon the bid, wherein the bid was determined by the tasker to be the winning bid. In a further aspect, the content asset can be processed in accordance with the task and, in some aspects, the processed content asset can be transmitted to a client. In an aspect, the bid can be a lowest of a plurality of bids. For example, bids can correlate with an expected completion time. In such an example, a lower bid can indicate a lower completion time. The winning bid can be a highest of the received bids. For example, bids can correlate with a likelihood that the corresponding network device will be able to complete the task. In such an example, the task can comprise a deadline, and a higher bid can indicate a higher percentage likelihood that the corresponding network device will be able to meet the deadline.

Optionally, the content asset can be received based upon the bid. In an aspect, the content asset can be received from the tasker, in another aspect, the content asset can be received/retrieved from a location, wherein the location is received from the tasker. In another aspect, the content asset can be received/retrieved based on instructions received from the tasker.

Figure 4:
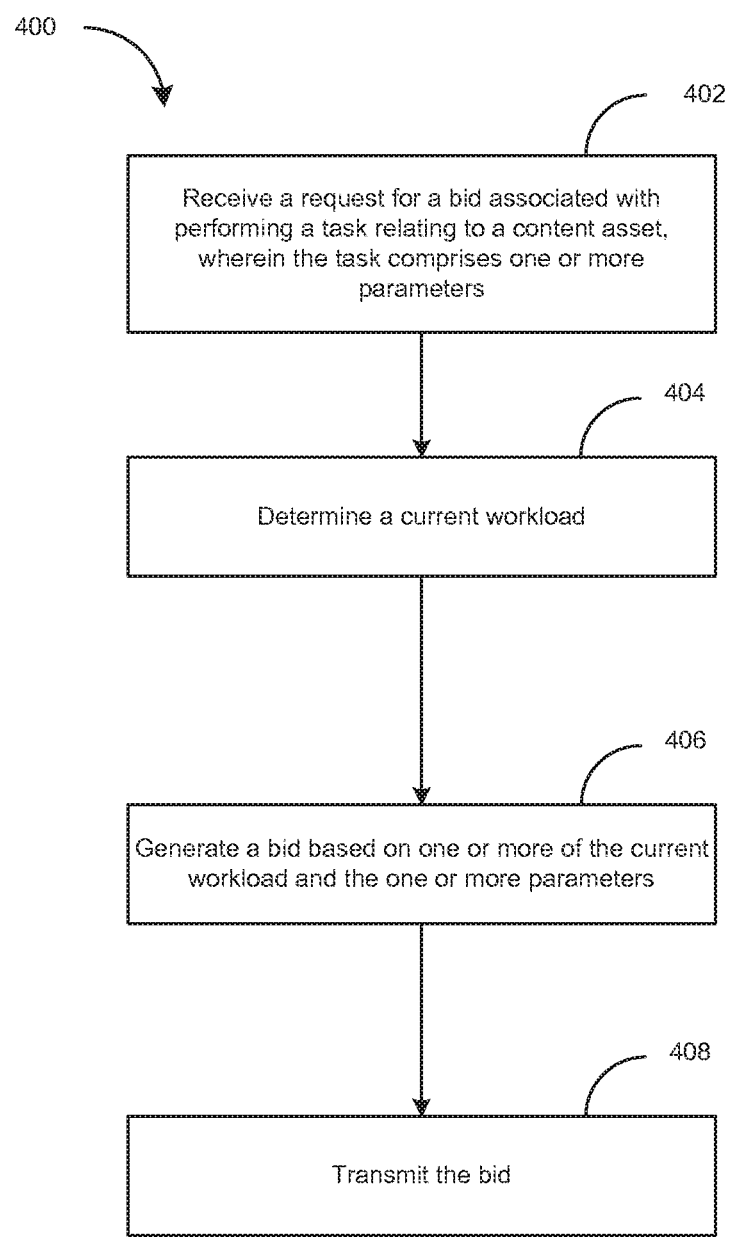
FIG. 4 is a flow chart of an exemplary method.

FIG. 4 is a flowchart illustrating example method 400. In an aspect, a request for a bid associated with performing a task relating to a content asset can be received at a network device at 402. In an aspect, the network device can be a video packager/processor. In an aspect, the task can comprise one or more parameters. A parameter can be, for example, a deadline to complete the task, an expected completion time, and/or a number of profiles. The request can be transmitted from a tasker to a network device. The request can be transmitted through a VLAN, such as VLAN 110 in FIG. 1. The request can be transmitted using any messaging protocol or combination of messaging protocols, such as the Transmission Control Protocol (TCP) and/or the Internet Protocol (IP).

At 404, a current workload of a network device can be determined. In an aspect, the current workload can be determined by examining one or more queues. In another aspect, the current workload can be determined by tracking the completion time of tasks as the tasks completed by the network device. In another aspect, the examined one or more queues and the tracked completion times can be used to determine a current workload, in an aspect, a bid can be based on properties of a prospective task, such as a priority or a deadline. For example, a priority can determine the position the prospective task will be placed in a queue. In such an example, the bid can be based on the expected completion time of the tasks that would be in front of the prospective task in the queue, as well as that of the prospective task. In an aspect, a prospective task can comprise a deadline and the bid can be based on a likelihood that the packager will be able to meet the deadline in light of tasks currently in its queue. In an aspect, the bid can be based on a cost. In an aspect, the cost can be based on a computational time and/or expenditure of the packager to complete the task. For example, a packager may be capable of hut inefficient at, performing a certain types of task. In such an instance, the packager would give a less desirable bid for the type of task than a packager that can perform the task more efficiently (or at a lower cost). In an aspect, the cost can be based on the cost to the tasks currently in the packager's queue. For example, if the prospective task has a high priority, allowing it the first position in the packager's queue, the cost can be the additional time each task in the queue will be delayed by accepting the task. If accepting the task will greatly increase the likelihood that a task in the queue will miss its deadline, then the cost can increase. Prior to determining the current workload, a determination of a network device's capability to service the task can be made. For example, if the task requires the packaging of high definition video and a particular video packager/processor is not capable of packaging high definition video, then the particular packager/processor does not need to determine a current workload. However, if network device determines that it is capable of servicing the task, then it can determine the currently workload.

In an aspect, a bid can be generated based on one or more of the current workload and the one or more parameters at 406. For example, the current workload can indicate a particular projected completion time or a particular projected completion time window for the task. In an aspect, a parameter can be an expected completion time and the bid can be generated by comparing the expected completion time with the projection completion time or time window. In an aspect, a parameter can be a deadline, and the bid can be generated by determining a likelihood that the task will be completed and returned by the deadline in light of the projected completion time or time window.

The bid can be transmitted at 408, for example from the network device to tasker. The bid can be transmitted through a VLAN, such as VLAN 110 in FIG. 1. The bid can be transmitted using any messaging protocol or combination of messaging protocols, such as the Transmission Control Protocol (TCP) and/or the Internet Protocol (IP). In an aspect, the tasker can determine that the bid is a winning bid and transmit the task to the network device in response to transmitting the bid.

Figure 5:
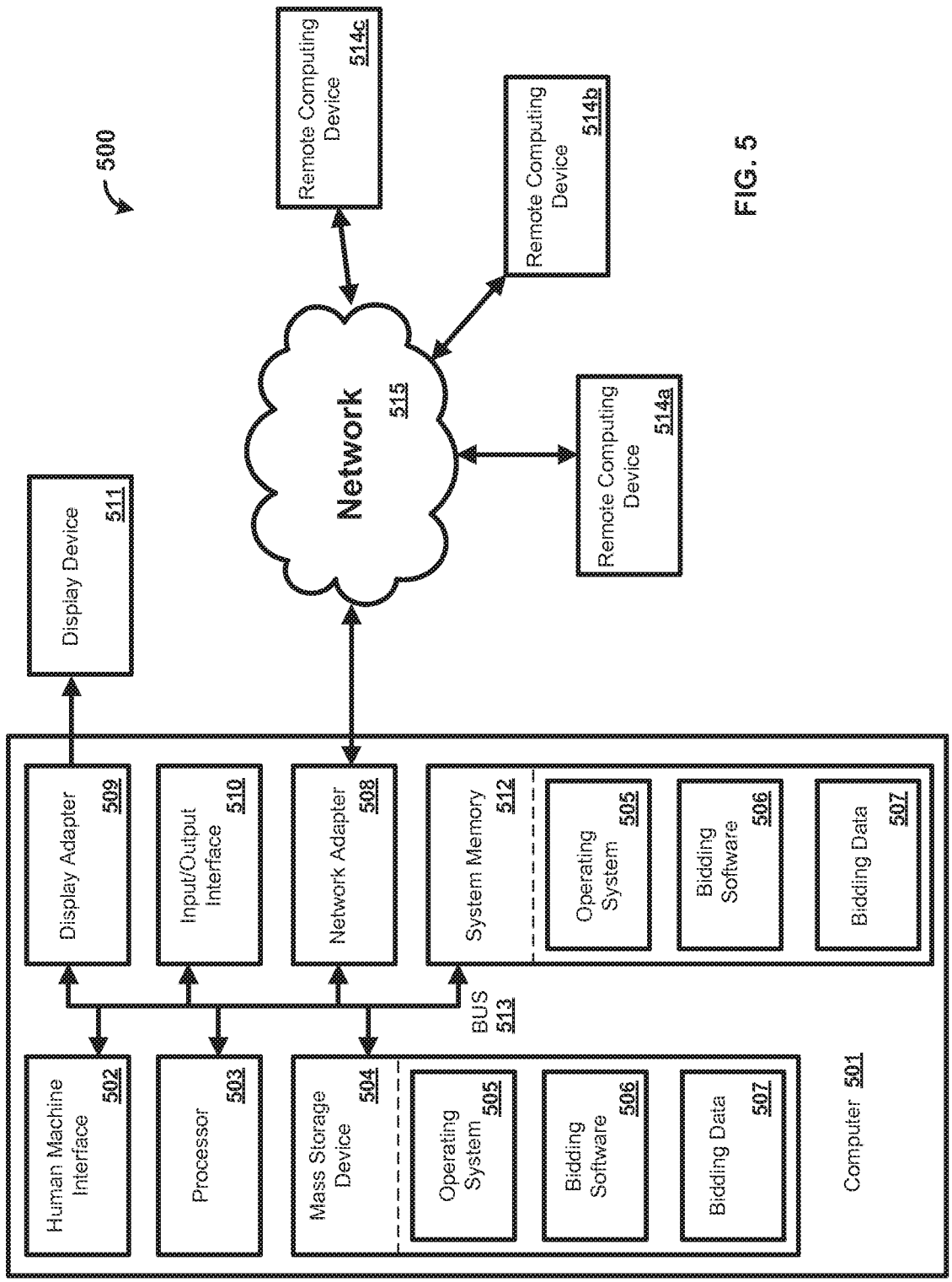
FIG. 5 is a block diagram of an exemplary computing device.

In an exemplary aspect, the methods and systems can be implemented on a computer 501 as illustrated in FIG. 5 and described below. By way of example, taskers 102*a-n* of FIG. 1 can be a computer as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors or processing units 503, a system memory 512, and a system bus 513 that couples various system components including the processor 503 to the system memory 512. In the case of multiple processing units 503, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the processor 503, a mass storage device 504, an operating system 505, bidding software 506, bidding data 507, a network adapter 508, system memory 512, an Input/Output Interface 510, a display adapter 509, a display device 511, and a human machine interface 502, can be contained within one or more remote computing devices 514*a,b,c* at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as bidding data 507 and/or program modules such as operating system 505 and bidding software 506 that are immediately accessible to and/or are presently operated on by the processing unit 503.

In another aspect, the computer 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and bidding software 506. Each of the operating system 505 and bidding software 506 (or some combination thereof) can comprise elements of the programming and the bidding software 506. Bidding data 507 can also be stored on the mass storage device 504. Bidding data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an inter ace, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output interface 510. Any step and/or result of the methods can be output in any form to an output device. Such output can be any form of visual representation, including, but not limited to, textual, graphical, animation, audio, tactile, and the like. The display 511 and computer 501 can be part of one device, or separate devices.

The computer 501 can operate in a networked environment using logical connections to one or more remote computing devices 514*a,b,c*. By way of example, a remote computing device can be a personal computer, portable computer, smartphone, a server, a router, a network computer, a peer device or other common network node, and so on. Logical connections between the computer 501 and a remote computing device 514*a,b,c* can be made via a network 515, such as a local area network (LAN) and/or a general wide area network (WAN). Such network connections can be through a network adapter 508. A network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of bidding software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium Which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, by a computing device, a request for a task associated with packaging and delivering a content asset;
   sending, to each network device of a plurality of network devices, information associated with the task;
   receiving, from each network device of the plurality of network devices, a bid of a plurality of bids, wherein each bid of the plurality of bids represents a cost associated with each network device of the plurality of network devices accepting the task and a capability of each network device to package and deliver the content asset;
   determining, based on the plurality of bids, a winning bid;
   sending, to a network device, of the plurality of network devices, associated with the winning bid, an assignment to complete the task; and
   causing the network device to receive the content asset and complete the task by packaging the content asset for delivery.

2. The method of claim 1, wherein causing the network device to receive the content asset comprises sending, to the network device, the content asset.

3. The method of claim 1 further comprising determining, by at least one network device of the plurality of network devices, before calculating a respective bid of the plurality of bids and based on a threshold, that the at least one network device is capable of completing the task.

4. The method of claim 1, wherein at least one bid of the plurality of bids is based at least on a current workload of a respective network device of the plurality of network devices.

5. The method of claim 1, wherein the plurality of network devices are determined based on one or more of a successful processing of a previous content asset, a failed processing of the previous content asset, a successful delivery of the previous content asset, or a failed delivery of the previous content asset.

6. The method of claim 1, wherein the information comprises a size of the content asset.

7. A method comprising:
   receiving, by a network device, a request for a bid associated with performing a task associated with packaging and delivering a content asset;

determining, by the network device and based on a cost and a capability to package and deliver the content asset, the bid, wherein the cost is associated with an expected completion time of the task;

sending the bid;

receiving, based on the bid, an assignment for the network device to perform the task;

receiving the content asset; and performing the task, wherein performing the task comprises at least packaging the content asset for delivery.

8. The method of claim 7, further comprising sending, based on performing the task, resulting information.

9. The method of claim 8, wherein sending the resulting information comprises sending, to a computing device, a notification that the content asset has been packaged and delivered.

10. The method of claim 7, wherein receiving the content asset comprises receiving the content asset with the assignment.

11. The method of claim 7, wherein the request comprises a size of the content asset.

12. The method of claim 7, wherein the bid is a lowest bid of a plurality of bids.

13. The method of claim 7, wherein the bid is further based at least on a size of the content asset.

14. The method of claim 7, wherein the request for the bid is received based on one or more of a successful processing of a previous content asset, a failed processing of the previous content asset, a successful delivery of the previous content asset, or a failed delivery of the previous content asset.

15. A method comprising:

receiving, by a network device, a request for a bid to perform a task associated with packaging and delivering a content asset, wherein the task comprises one or more parameters;

determining a current workload and a capability of the network device to package and deliver the content asset;

determining, based on the capability and one or more of the current workload or the one or more parameters, the bid;

sending the bid;

receiving, based on the bid, an assignment for the network device to perform the task;

receiving the content asset;

performing the task, wherein performing the task comprises at least packaging the content asset to be sent; and sending, based on performing the task, the content asset.

16. The method of claim 15, wherein the one or more parameters comprise an encoding format, wherein the request for the bid is received based on one or more of a successful processing of a previous content asset, a failed processing of the previous content asset, a successful delivery of the previous content asset, or a failed delivery of the previous content asset.

17. The method of claim 15, wherein sending the content asset comprises sending the content asset to a content player.

18. The method of claim 15, wherein the one or more parameters comprise a deadline to complete the task.

19. The method of claim 18, wherein determining the bid further comprises determining, based on a likelihood of completing the task by the deadline, the bid.

20. The method of claim 15, further comprising:

receiving another plurality of bids associated with performing the task; and comparing the bid to the another plurality of bids.

* * * * *